(12) United States Patent
Brown et al.

(10) Patent No.: US 12,123,551 B2
(45) Date of Patent: Oct. 22, 2024

(54) PORTABLE NATURAL GAS DISTRIBUTION SYSTEM

(71) Applicant: Comanche Gas Solutions LLC, Comanche, TX (US)

(72) Inventors: Gregory Brown, Comanche, TX (US); Kasey Noles, Comanche, TX (US); Steven Gillette, Comanche, TX (US)

(73) Assignee: COMANCHE GAS SOLUTIONS LLC, Comanche, TX (US)

( * ) Notice: Subject to any disclaimer, the term of this patent is extended or adjusted under 35 U.S.C. 154(b) by 320 days.

(21) Appl. No.: 17/503,107

(22) Filed: Oct. 15, 2021

(65) Prior Publication Data
US 2023/0123358 A1    Apr. 20, 2023

(51) Int. Cl.
| | |
|---|---|
| *F17C 13/04* | (2006.01) |
| *B67D 7/04* | (2010.01) |
| *B67D 7/78* | (2010.01) |
| *B67D 7/84* | (2010.01) |
| *E21B 43/26* | (2006.01) |
| *F02C 7/22* | (2006.01) |
| *F17C 7/00* | (2006.01) |

(52) U.S. Cl.
CPC ............... *F17C 13/04* (2013.01); *B67D 7/04* (2013.01); *B67D 7/78* (2013.01); *B67D 7/845* (2013.01); *E21B 43/2607* (2020.05); *F02C 7/222* (2013.01); *F17C 7/00* (2013.01); *F17C 2205/0332* (2013.01); *F17C 2205/0338* (2013.01); *F17C 2205/0341* (2013.01); *F17C 2205/0364* (2013.01); *F17C 2205/037* (2013.01); *F17C 2221/033* (2013.01); *F17C 2265/068* (2013.01); *F17C 2270/0554* (2013.01)

(58) Field of Classification Search
CPC ... B67D 7/78; B67D 7/04; B67D 7/40; B67D 7/845; E21B 43/2607; F02C 7/222; F17C 13/04; F17C 2205/0332; F17C 2205/0338; F17C 2205/034; F17C 2205/0364; F17C 2205/037; F17C 2221/033; F17C 2265/068; F17C 2270/0554; F17C 2205/0142; F17C 2205/0146; F17C 2205/0323; F17C 2205/0341
See application file for complete search history.

(56) References Cited

U.S. PATENT DOCUMENTS

| | | | |
|---|---|---|---|
| 4,636,106 A | | 1/1987 | Waisbrod |
| 5,148,945 A | | 9/1992 | Geatz |
| 5,584,321 A | * | 12/1996 | Hargreaves ........ G05D 16/2013 137/613 |

(Continued)

FOREIGN PATENT DOCUMENTS

| | | |
|---|---|---|
| CN | 203639140 U | 6/2014 |
| EP | 3270034 B1 | 9/2020 |

(Continued)

OTHER PUBLICATIONS

Liquip Website Information, "Truck Mounted Dispenser Systems", downloaded from the internet at https://web.archive.org/web/20160713120825/https:/www.liquip.com/products/tanker/metering-dispensing-gauging/dispenser-systems/truck-mounted-dispenser-systems on Jan. 17, 2024 (2 pgs).

*Primary Examiner* — Atif H Chaudry
(74) *Attorney, Agent, or Firm* — STINSON LLP

(57) ABSTRACT

Portable natural gas distribution systems for dual fuel fleets such as hydraulic fracturing fleets are described.

23 Claims, 11 Drawing Sheets

(56) References Cited

U.S. PATENT DOCUMENTS

| | | | |
|---|---|---|---|
| 5,730,166 A * | 3/1998 | Ackerley | F17D 1/075 137/505.12 |
| 6,152,197 A | 11/2000 | Gerardot | |
| 6,867,729 B2 | 3/2005 | Berry et al. | |
| 7,165,573 B2 | 1/2007 | Gotthelf | |
| 7,328,728 B1 | 2/2008 | Vilar | |
| 7,392,699 B2 | 7/2008 | Motzer et al. | |
| 8,055,526 B2 | 11/2011 | Blagg et al. | |
| 8,584,802 B2 | 11/2013 | Earl et al. | |
| 8,684,028 B2 | 4/2014 | Perez | |
| 9,346,662 B2 | 5/2016 | Van Vliet et al. | |
| 9,403,511 B2 | 8/2016 | Cajiga et al. | |
| 9,586,805 B1 | 3/2017 | Shock | |
| 9,711,838 B2 | 7/2017 | Heath | |
| 9,790,080 B1 | 10/2017 | Shock | |
| 9,815,683 B1 | 11/2017 | Kalala et al. | |
| 9,932,220 B1 | 4/2018 | Shock | |
| 9,981,840 B2 | 5/2018 | Shock | |
| 10,029,906 B2 | 7/2018 | Van Vliet et al. | |
| 10,087,065 B2 | 10/2018 | Shock | |
| 10,150,662 B1 | 12/2018 | Shock | |
| 10,196,258 B2 | 2/2019 | Kalala et al. | |
| 10,289,126 B2 | 5/2019 | Shock | |
| 10,303,190 B2 | 5/2019 | Shock | |
| 10,442,676 B1 | 10/2019 | Walther | |
| 10,494,251 B2 | 12/2019 | Shock | |
| 10,513,426 B2 | 12/2019 | Shock | |
| 10,633,243 B2 | 4/2020 | Shock | |
| 10,705,547 B2 | 7/2020 | Shock | |
| 10,717,639 B2 | 7/2020 | Walther | |
| 10,759,649 B2 | 9/2020 | Haile et al. | |
| 10,815,118 B2 | 10/2020 | Shock | |
| 10,830,031 B2 | 11/2020 | Shock | |
| 10,882,732 B2 | 1/2021 | Haile et al. | |
| 10,926,996 B2 | 2/2021 | Shock | |
| 10,954,117 B2 | 3/2021 | Shock et al. | |
| 10,974,955 B2 | 4/2021 | Shock | |
| 2007/0181212 A1 | 8/2007 | Fell | |
| 2008/0230146 A1 | 9/2008 | Kastner et al. | |
| 2009/0314384 A1 | 12/2009 | Brakefield et al. | |
| 2011/0197988 A1 | 8/2011 | Van Vliet et al. | |
| 2014/0261695 A1 | 9/2014 | Dehring et al. | |
| 2014/0318638 A1 * | 10/2014 | Harwood | B65H 75/4478 137/355.12 |
| 2014/0352830 A1 | 12/2014 | Kenan et al. | |
| 2016/0076533 A1 | 3/2016 | Moffitt, Jr. | |
| 2016/0130130 A1 | 5/2016 | Nelson et al. | |
| 2016/0310986 A1 | 10/2016 | Matlack | |
| 2016/0362195 A1 | 12/2016 | Wilkinson et al. | |
| 2017/0305736 A1 | 10/2017 | Haile et al. | |
| 2017/0313570 A1 | 11/2017 | Kittoe | |
| 2018/0099864 A1 | 4/2018 | Shock | |
| 2019/0106316 A1 | 4/2019 | Van Vliet et al. | |
| 2019/0119096 A1 | 4/2019 | Haile et al. | |
| 2019/0127208 A1 | 5/2019 | Shock | |
| 2019/0337794 A1 | 11/2019 | Kalala et al. | |
| 2020/0062577 A1 | 2/2020 | Meredith et al. | |
| 2020/0062578 A1 | 2/2020 | Shock | |
| 2020/0109043 A1 | 4/2020 | Shock | |
| 2020/0122999 A1 | 4/2020 | Shock | |
| 2021/0188616 A1 | 6/2021 | Shock | |
| 2021/0206622 A1 | 7/2021 | Shock | |
| 2021/0221570 A1 | 7/2021 | Shock | |
| 2021/0348476 A1 * | 11/2021 | Yeung | E21B 43/267 |
| 2022/0349345 A1 * | 11/2022 | Zhang | F02C 7/222 |

FOREIGN PATENT DOCUMENTS

| | | |
|---|---|---|
| GB | 2485832 A | 5/2012 |
| JP | 2004-360800 A | 12/2004 |
| WO | 2010111888 A1 | 10/2010 |
| WO | 2016073267 A1 | 5/2016 |

* cited by examiner

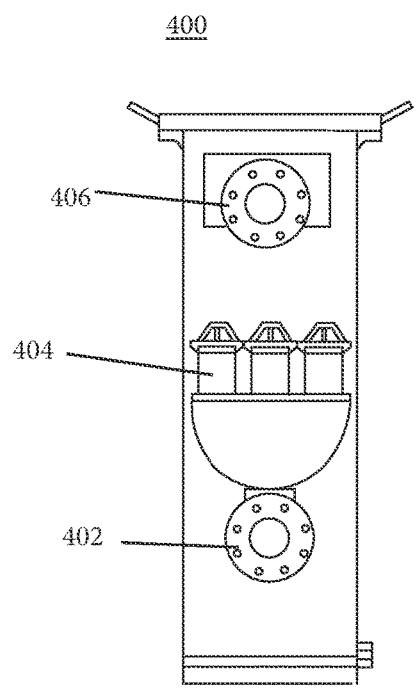
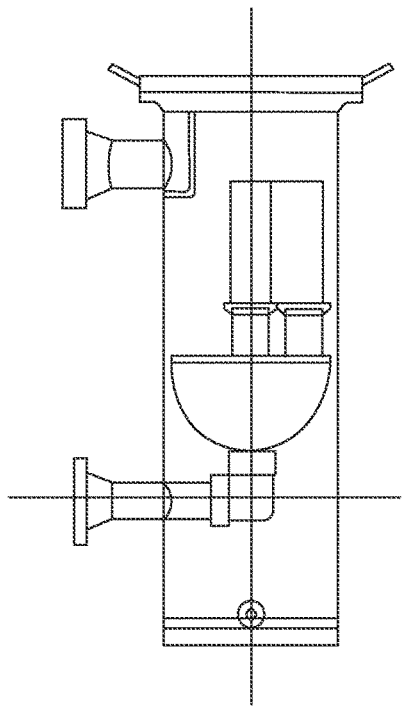
FIG. 4A      FIG. 4B
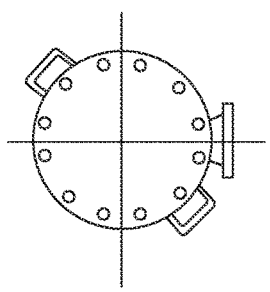
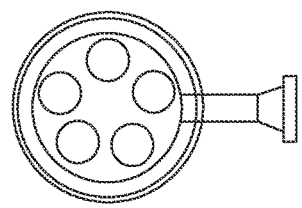
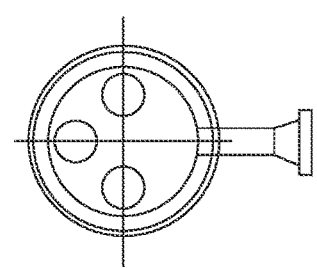
FIG. 4C      FIG. 4D      FIG. 4E

PORTABLE NATURAL GAS DISTRIBUTION SYSTEM

FIELD

Some implementations relate generally to gas distribution systems, and, more particularly, to portable natural gas distribution system for alternative diesel stimulating hydraulic fracturing fleets such as dual fuel, natural gas reciprocating engine, and power generation fleets.

BACKGROUND

Traditionally, engines operating pumps and other equipment on hydraulic fracturing sites ("fracking sites" or "frack sites") have relied on diesel fuel. For example, on a standard zipper frack site there are about 20 2500 hp diesel engines, consuming about 20,00 gallons of diesel per day.

This approach presents two problems for operators: first, is how to reduce reliance on diesel for hydraulic pressure pumping and producer companies, and second, is how the industry can reduce its environmental (e.g., carbon) emission profile and use technology to reduce emissions.

Some hydraulic fracturing fleets exist that may utilize natural gas to power the engines. A conventional gas fueling solution can include rigging up a daisy chain system and hooking multiple hoses on a section of natural gas line (e.g., 300 feet) to about 20 pumps. There are numerous problems with this conventional arrangement: 1) difficulty getting an efficient flow of gas to the engines, 2) the hybrid engines are either all on or completely off meaning consuming only diesel—if there is a problem with the daisy chained fuel line, the whole natural gas fuel line has to shut down, 3) offers limited safety features, for example, the gas line is under high pressure with limited controls, which can lead to safety issues.

Embodiments were conceived in light of the above-mentioned problems and limitations, among other things. The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

SUMMARY

Some implementations can include natural gas distribution or natural gas fueling to alternative diesel stimulation hydraulic fracturing fleets. Alternative diesel stimulation hydraulic fracturing fleets include dual fuel enabled engines, natural gas reciprocating engines, and e-fleets. Dual fuel enabled fracturing fleets are defined by engines that consume both natural gas and diesel. Dual fuel enabled fracturing fleets substitute natural gas with diesel by an amount of about 30 to 85%. A natural gas reciprocating engine fleet consumes 100% natural gas. An e-fleet consists of pumps powered by electric turbines. Portable natural gas distribution systems provide natural gas as a fuel source to either engines or turbines.

Some implementations can include a portable gas distribution system comprising a mobile trailer. The mobile trailer having onboard an input gas fitting and an emergency shut off valve coupled on a first side to the input gas fitting. The mobile trailer also including a pressure reducer having a first side coupled to a second side of the emergency shut off valve and one or more coalescing filters coupled to a second side of the pressure reducer, wherein each coalescing filter includes a first filter to remove water. The mobile trailer further including one or more manifolds having a first side coupled to a second side of the one or more coalescing filters respectively, each manifold having a plurality of ports, wherein each port is coupled to a low-pressure slam shut valve, wherein each manifold includes a diffuser and a plurality of hoses each having a first end and a second end, wherein each first end of each hose is coupled to a respective low-pressure slam shut valve.

In some implementations, each coalescing filter can include a second filter to filter particulates and heavy hydrocarbons. In some implementations, each hose is wound onto a respective hose reel. In some implementations, each second end of each hose includes a quick connector to connect to an engine to supply gas to the engine. In some implementations, the one or more manifolds includes two manifolds. In some implementations, the plurality of ports for each manifold includes 10-20 ports.

Some implementations can include a portable gas distribution system. The system can include a pressure reducer having a first side coupled to an input gas fitting and one or more coalescing filters coupled to a second side of the pressure reducer, wherein each coalescing filter includes a first filter to remove water and a second filter to filter particulates and heavy hydrocarbons. The system can also include one or more manifolds having a first side coupled to a second side of the one or more coalescing filters respectively, each manifold having a plurality of ports, wherein each port is coupled to a low-pressure slam shut valve, wherein each manifold includes a diffuser and at least one hose having a first end and a second end, wherein the first end of the at least one hose is coupled to a respective low-pressure slam shut valve.

In some implementations, an emergency cutoff valve is disposed between the pressure reducer and the input gas fitting. In some implementations, the at least one hose is wound onto a respective hose reel. In some implementations, the second end of the at least one hose includes a quick connector to connect to an engine to supply gas to the engine.

In some implementations, the one or more manifolds includes two manifolds. In some implementations, the plurality of ports for each manifold includes 10-20 ports.

Some implementations can include a gas distribution system comprising one or more coalescing filters coupled to a pressure reducer supplying input gas, wherein each coalescing filter includes a first filter to remove water and one or more manifolds having a first side coupled to a second side of the one or more coalescing filters respectively, each manifold having a plurality of ports, wherein each port is coupled to a low-pressure slam shut valve, wherein each manifold includes a diffuser. The system can also include at least one hose having a first end and a second end, wherein the first end of the at least one hose is coupled to a respective low-pressure slam shut valve.

In some implementations, the system can further comprise an input gas fitting. In some implementations, the system can also comprise an emergency shut off valve coupled on a first side to the input gas fitting, and a pressure reducer having a first side coupled to a second side of the emergency shut off valve. In some implementations, the at least one hose is wound onto a respective hose reel. In some implementations, the second end of the at least one hose includes a quick connector to connect to an engine to supply gas to the engine.

In some implementations, each of the one or more manifolds includes two manifolds. In some implementations, the plurality of ports for each manifold includes 10-20 ports. In some implementations, the manifold includes a second filter to filter particulates and heavy hydrocarbons.

BRIEF DESCRIPTION OF THE DRAWINGS

FIGS. 4A-4E are diagrams showing an example coalescing filter in accordance with some implementations.

DETAILED DESCRIPTION

Figure 1:
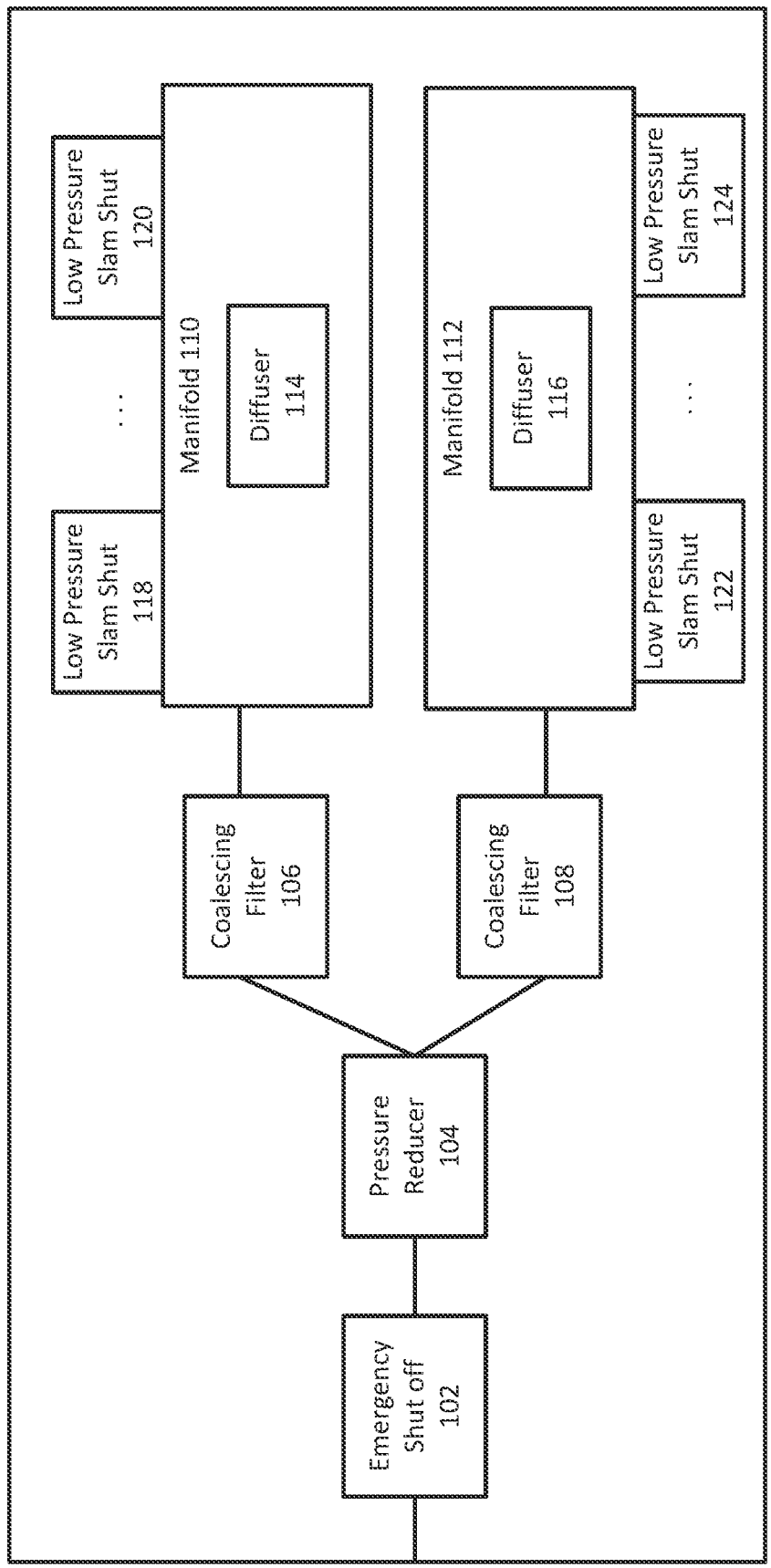
FIG. 1 is a diagram showing an example portable natural gas distribution system in accordance with some implementations.

Some implementations can include a portable gas distribution system that addresses one or more of the above-mentioned problems or needs. For example, some implementations can provide:

1) Gas distribution efficiency—e.g., proper flows and pressures to frack pumps on location;
2) Safety measures—e.g., low pressure slam shuts, ventilation systems;
3) Filtration—e.g., coalescing filters and diffusers; and
4) Operational efficiency—e.g., mobile, bleed off valves.

In general, the disclosed system provides "last mile" efficient delivery of natural gas fuel for engines on a frack site or other locations where a portable natural gas distribution system may be advantageous. Natural gas is provided by a gas source to the disclosed portable gas distribution system and, in turn, to engines (e.g., dual fuel engines).

Portability is an important feature because frack sites move every 18-35 days, for example, thus equipment needs to be easy to rig up, operate, and be mobile and portable.

Natural gas sources can include 1) a producing well nearby—called "field gas"—usually impure so it is usually flared off, if there is good quality natural gas then it can be used—a good BTU value for field gas is around 1050 BTU, 2) pipeline gas—if there is a pipeline infrastructure near the fracking site, gas can be taken from the pipeline to fuel frack fleets—pipeline gas sometimes has water in it which can damage engines if not caught and removed, and 3) haul in compressed natural gas from 20-100 miles away, decompress gas and feed lower pressure gas to engines.

In operation, gas from the gas source—depending on pressure—e.g., pipeline—comes off a 3" line at 1200 psi into a desiccant dryer then to pressure regulator to drop the pressure from 1220 psi to 550 psi (e.g., via regulator or high-pressure control valve). The gas source may include an underground line to system (typically situated by well head).

In some implementations, the portable gas distribution system (or trailer) includes a master regulator (e.g., a "little joe" regulator) to reduce pressure from about 550 psi to 140 psi in the trailer. The gas then goes through a coalescing filter (to catch any liquids or oils present), which can shut off gas if the impurities get too high.

The gas then travels through a manifold (a single manifold in some systems and a double stacked manifold in others). Each manifold can include a number of outlets (e.g., 13 outlets per manifold), which is an important feature to be able to supply enough gas lines for the engines on a standard zipper fracking formation. Some implementations of the portable gas distribution system can include two or more manifolds that each include a diffuser to balance back pressure and permit the system to maximize flow.

After the diffuser, the gas goes through the manifold and out of the ports. Each port has a ball valve and a low-pressure slam shut. In some implementations, a low-pressure slam shut can be made by using a standard regulator and reversing certain components to create a valve that senses a decrease in pressure and will slam a valve shut valve when pressure decreases below a threshold.

The gas then travels through a hose (e.g., 1" or 1½" hose) mounted on reel (e.g., about 175 feet long), through a quick connect valve at distal end of each hose that quick connects to a pistol at the engine or dual fuel kit.

Some implementations can include monitoring automation and controls to individually monitor and control the gas going out each of the ports (e.g., how much gas is going out, temperature, flow rate, pressure, etc.).

As fracking fleets consume more and more natural gas, an implementation may be designed to accommodate the increased demand. Current demand is about 3000 mcf/day to 6000 mcf/day. Future will 8000 mcf/day or more. For example, some current implementations include a 6" manifold and newer designed units will have a 10" manifold.

Some implementations can include a natural gas distribution system mounted on a mobile trailer. This portable, modular system contains the components for portable natural gas distribution. The trailer can include a 24-36-foot-long trailer or 40-foot enclosure depending on configuration and having up to 28 hose reels powered by 12v electric, with some solenoid valves and wiring to connect to a battery on a truck. The hose reels are electric to make winding up easier.

The system can include a gas manifold (e.g., 6"-10" manifold) having a diffuser disposed inside. As input the trailer includes a gas master regulator to lower input gas pressure (e.g., from to 100 to 150 psi down. The trailer has one or more manifolds with multiple ports leaving each manifold (e.g., 13 ports per manifold). Each manifold also has a high-pressure relief valve. A typical portable gas distribution system design includes two manifolds and up to 28 ports.

An emergency shut off valve is disposed between the gas source line and manifold(s), which can include a large high-pressure slam shut and actuator, e.g., actuated ball valve. The system can also include a pneumatic master regulator to control pressure going into the manifold (e.g., located between source line and manifold, to take input pressure from 550 psi down to 150 psi for input to manifold). An advantage of the disclosed system is that it can manage direct flow (e.g., a direct fuel system) to engines and essentially becomes a direct injection fuel management system.

The system can also include low pressure control valves on each manifold port between each port and (this is low pressure slam shut) high pressure slam shut. The low-pressure slam shut valves can include a modified high-pressure slam shut to low pressure slam shut by flipping the orifice plat and flipping rotator valve plate and peanut valve. The low-pressure slam shut valves recognize a drop to a certain pressure where the valve will slam shut and not send gas to the single line connected to that slam shut. The other lines can remain open, and gas can be flowing in those lines. This creates enhanced safety features. If a hose or natural gas fuel line is compromised, then gas is shut off at the low-pressure slam shut. This is also an improvement over some conventional systems that are all or nothing in terms of being on or off.

The system can also include drain valves and lines (e.g., three per low pressure slam shut) and monitors for the lines. Gas flow meters can be used. For example, one gas flow meter for an individual flow port can be used or can be added after the low-pressure slam to monitor each line.

The portable gas distribution system can also include a coalescing filter for each manifold—the coalescing filter disposed after the master pressure regulator and prior to the manifold. The coalescing filter can include a two-stage filtration coalescing filter with a vertical orientation gravity drop water knock out followed by 3 or 5 element filter (e.g., a particulate and heavy hydrocarbon filter cartridge), with one per manifold. The system can include a ventilation system having pop off valves on each manifold.

The system can include a plurality of reels on the mobile trailer with a plurality of hoses connected to each respective reel. A plurality of valves on the mobile trailer are situated between the manifold and the reels and utilized to monitor and control gas flow through the flow ports. Gas flow sensors can be connected to the hoses.

The system can include a controller configured to manage valves responsive to gas thresholds to control gas flow to hoses. For example, one implementation can include a low-pressure slam shut from drop in pressure. Another implementation can include actuated valves that respond to radio signals. An implementation can be completely pneumatic.

However, portable gas distribution trailers are typically utilized in high pressure areas where it is dangerous to work in. An implementation with remote measurement and control capabilities could make the system safer. For example, electronic shut down (ESD) valves could be used in the case of fire or emergency.

The end of each hose has a quick connect connector and a bleeder valve. The quick connect connects to a customized applicable fitting to permit the hose to connect to the dual fuel engine, natural gas reciprocating engine, or turbine. The pistol fitting connects to a 2" flange connection on the engine to make it adaptable to the hose.

FIG. 1 is a diagram showing an example portable natural gas distribution system 100 in accordance with some implementations. The system 100 is a dual stack system (a single stack or multi-stack system with more than two stacks is also possible) includes an optional emergency shut off 102 that is a mechanism at the very beginning of the trailer and can close off all gas going out of the system 100. If the gas source is a pipeline, there may be a desiccant dryer and/or an initial pressure reducer (e.g., to reduce the source gas pressure from 1220 psi to 550 psi) such as regulator or high-pressure control valve leading to the emergency shot off 102.

Following the emergency shut off 102, the system 100 includes a pressure reducer 104. The pressure reducer 104 can reduce the pressure of the gas (e.g., from 550 psi to 140 psi). The pressure reducer 104 can include a regulator such as a "Little Joe" regulator or the like.

The system 100 also includes two coalescing filters 106 and 108 each leading to a respective manifold 110 and 112. Each manifold 110 and 112 includes a respective diffuser 114 and 116. Each manifold 110 and 112 includes a respective plurality of low-pressure slam shut valves 118-120 and 122-124.

Figure 2A:
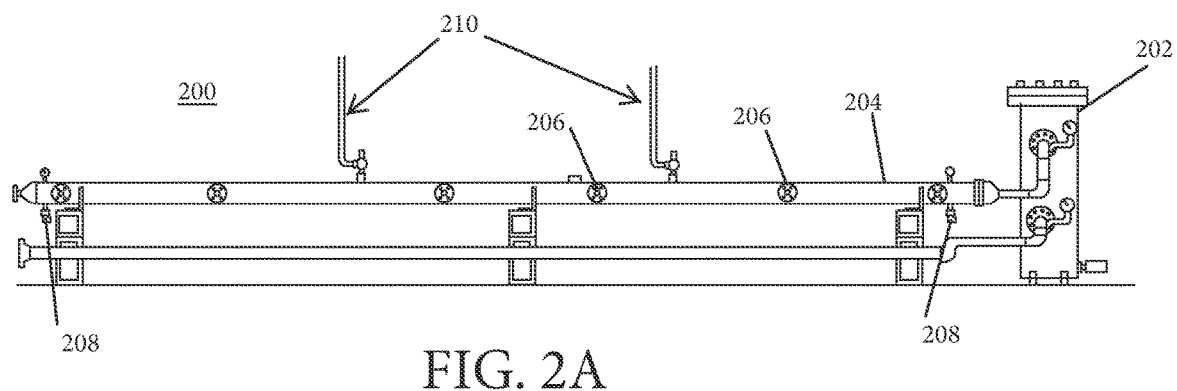
FIGS. 2A-2D are diagrams showing an example single stack portable natural gas distribution system in accordance with some implementations.
Figure 2B:
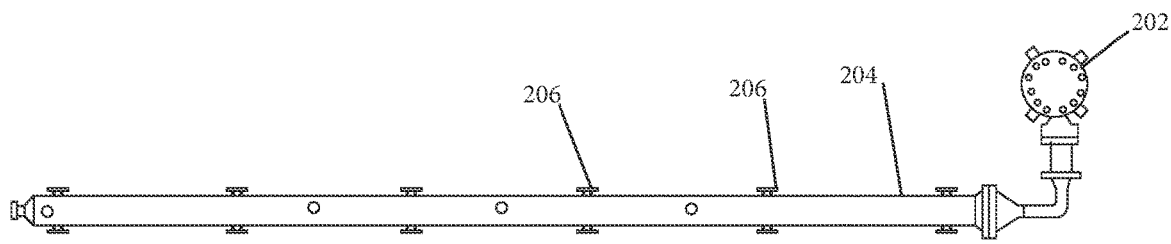

FIGS. 2A-2D are diagrams showing an example single stack portable natural gas distribution system 200 in accordance with some implementations. As shown in FIG. 2A, the system 200 includes a coalescing filter 202, a manifold 204, and a plurality of ports 206 (13 ports in this example). FIG. 2B shows a top view of the single stack system 200.

Figure 2C:
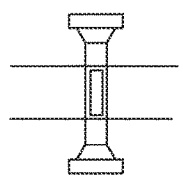
Figure 2D:
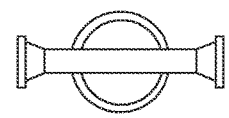

FIGS. 2C and 2D show views of a diffuser that is an internal part of the manifold and is constructed to balance back pressure and to help maximize system flow.

Figure 3A:
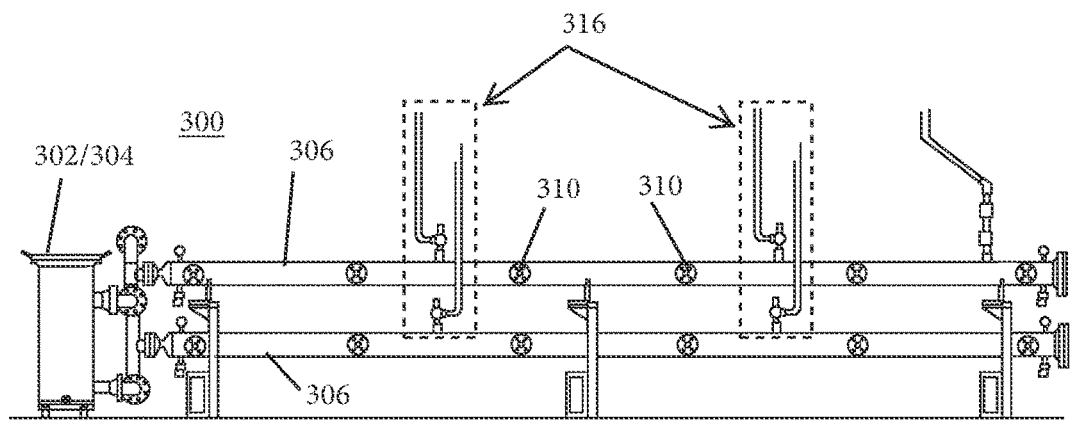
FIGS. 3A-3B are diagrams showing an example double stack portable natural gas distribution system in accordance with some implementations.
Figure 3B:
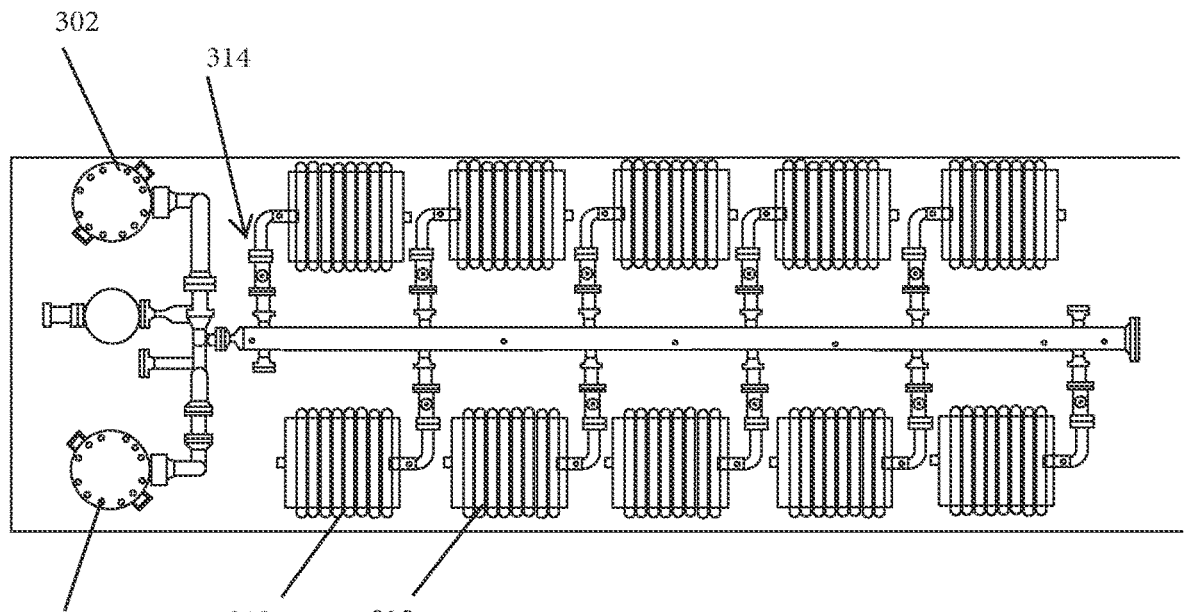

FIGS. 3A-3B are diagrams showing an example dual stack portable natural gas distribution system 300 in accordance with some implementations. The dual stack system 300 includes dual coalescing filters 302 and 304 coupled to dual manifolds 306 and 308, respectively.

As shown in FIG. 3B, a plurality of hose spools 312 are coupled to respective ports 310 on a manifold 306 or 308.

FIGS. 4A-4E are diagrams showing an example coalescing filter in accordance with some implementations. FIG. 4A shows a front view of the coalescing filter 400 having an inlet 402, three elements 404, and an outlet 406. FIG. 4B shows a side view of the coalescing filter 400. FIG. 4C shows a top view of the filter 400. FIG. 4D shows a top view of a five-element filter. FIG. 4E shows a top view of a three-element filter (e.g., 404).

Figure 5:
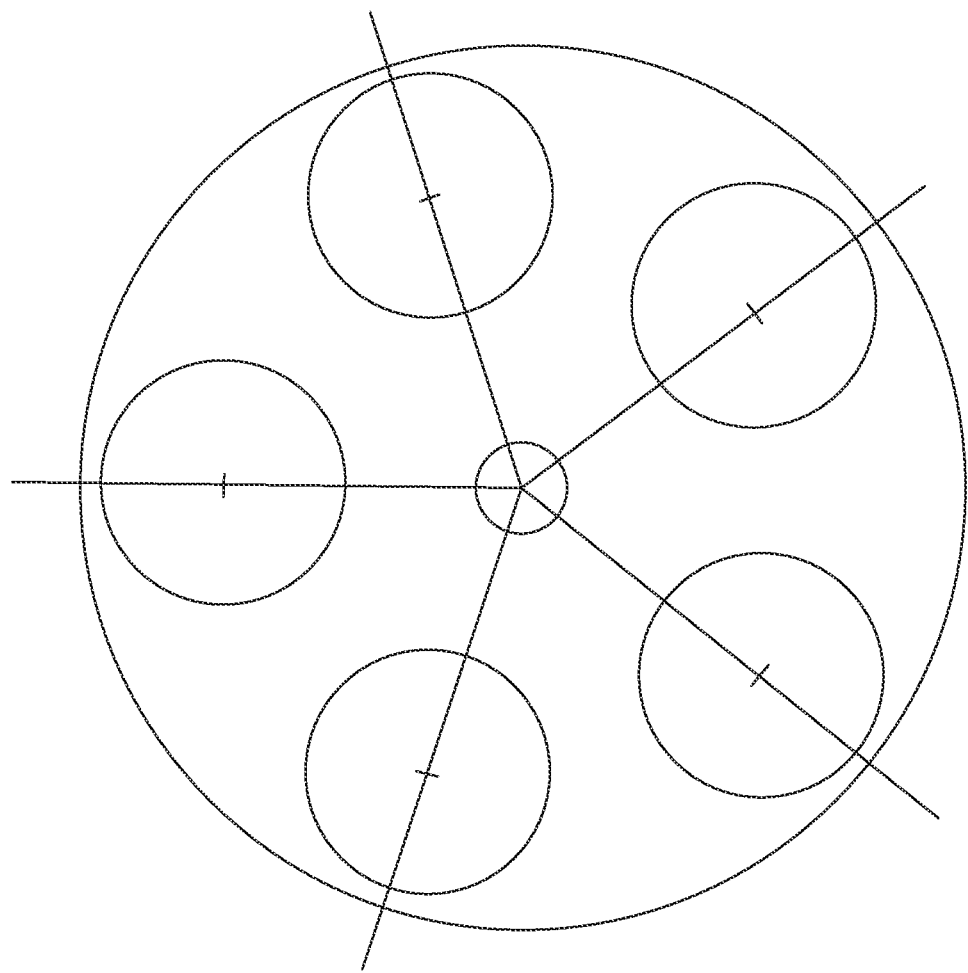
FIG. 5 is a diagram showing an internal view of an example five element coalescing filter in accordance with some implementations.

FIG. 5 is a diagram showing an internal view of an example five element coalescing filter in accordance with some implementations. The five-element filter includes five apertures (one for each element) spaced apart on 72-degree radial centers.

Figure 6A:
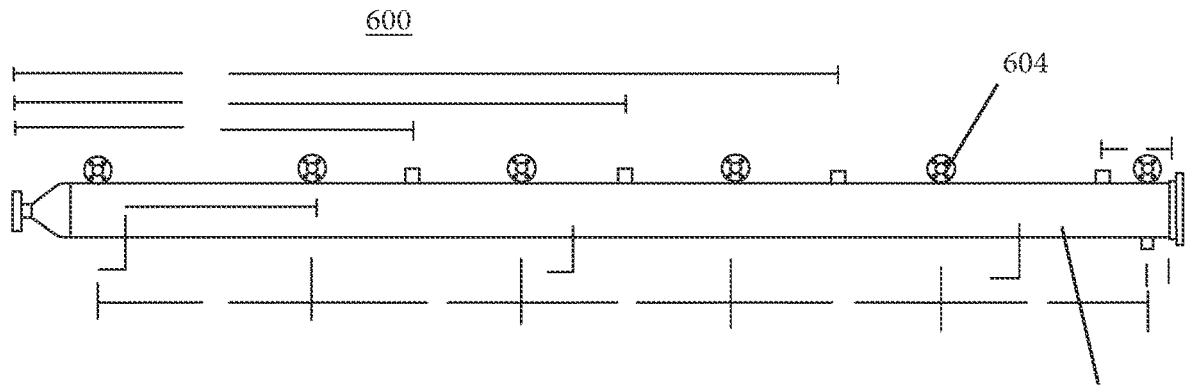
FIGS. 6A-6E are diagrams showing an example manifold in accordance with some implementations.
Figure 6B:
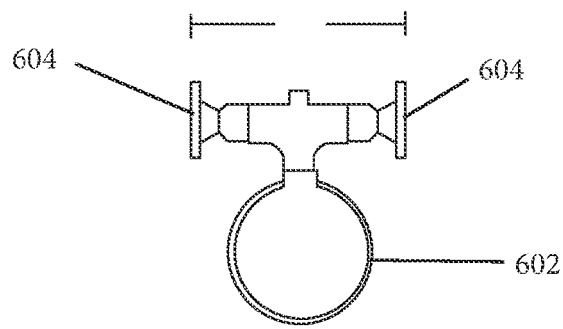
Figure 6C:
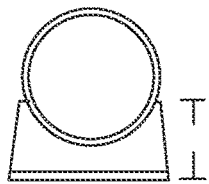
Figure 6D:
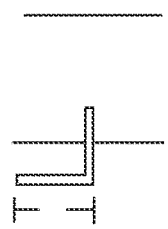
Figure 6E:
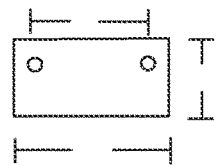

FIGS. 6A-6E are diagrams showing an example manifold 600 in accordance with some implementations. The manifold 600 can be similar to 204, 306, and 308 discussed above. The manifold 600 includes a manifold body 602 and a plurality of ports 604. FIGS. 6C-6E show views of a manifold support bracket.

Figure 7A:
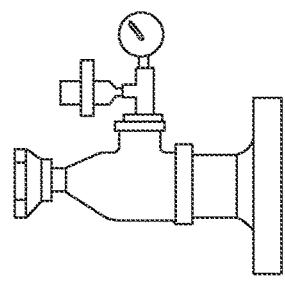
FIGS. 7A-7C are diagrams showing various flange orientations in accordance with some implementations.
Figure 7B:
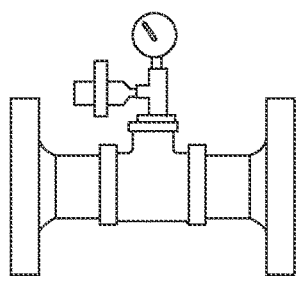
Figure 7C:
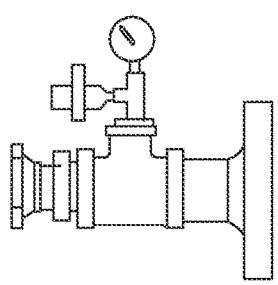

FIGS. 7A-7C are diagrams showing various flange arrangements in accordance with some implementations. The flange arrangements are located after the low-pressure slam shut and before hose. Flange arrangements are designed to reduce line size from 2 inch to 1 inch or 1.5 inch depending on fuel hose size.

Figure 8A:
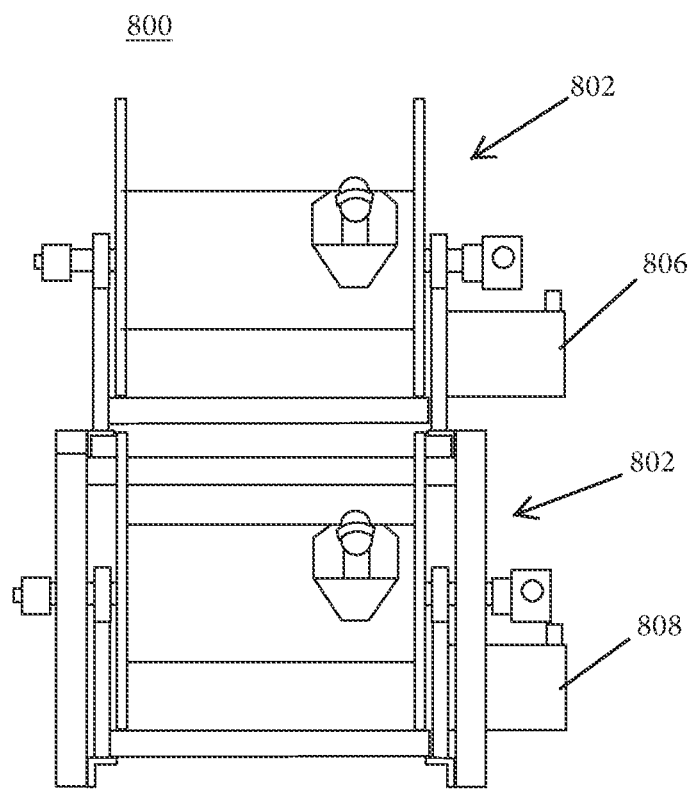
FIGS. 8A-8B are diagrams of example dual hose reels in accordance with some implementations.
Figure 8B:
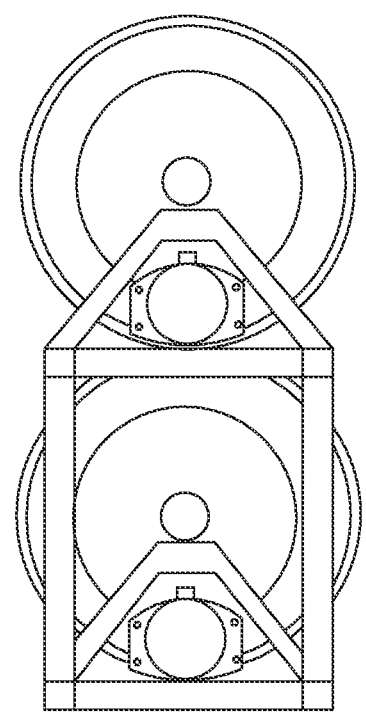

FIGS. 8A-8B are diagrams of example dual hose reels 800 in accordance with some implementations. The dual hose reel 800 includes a top hose reel 802 and a bottom hose reel 804. The dual hose reels 802/804 include hoses that connect to respective ports on a manifold. The hose reels 802 and 804 can include electric winding motors 806 and 808, respectively.

Figure 9:
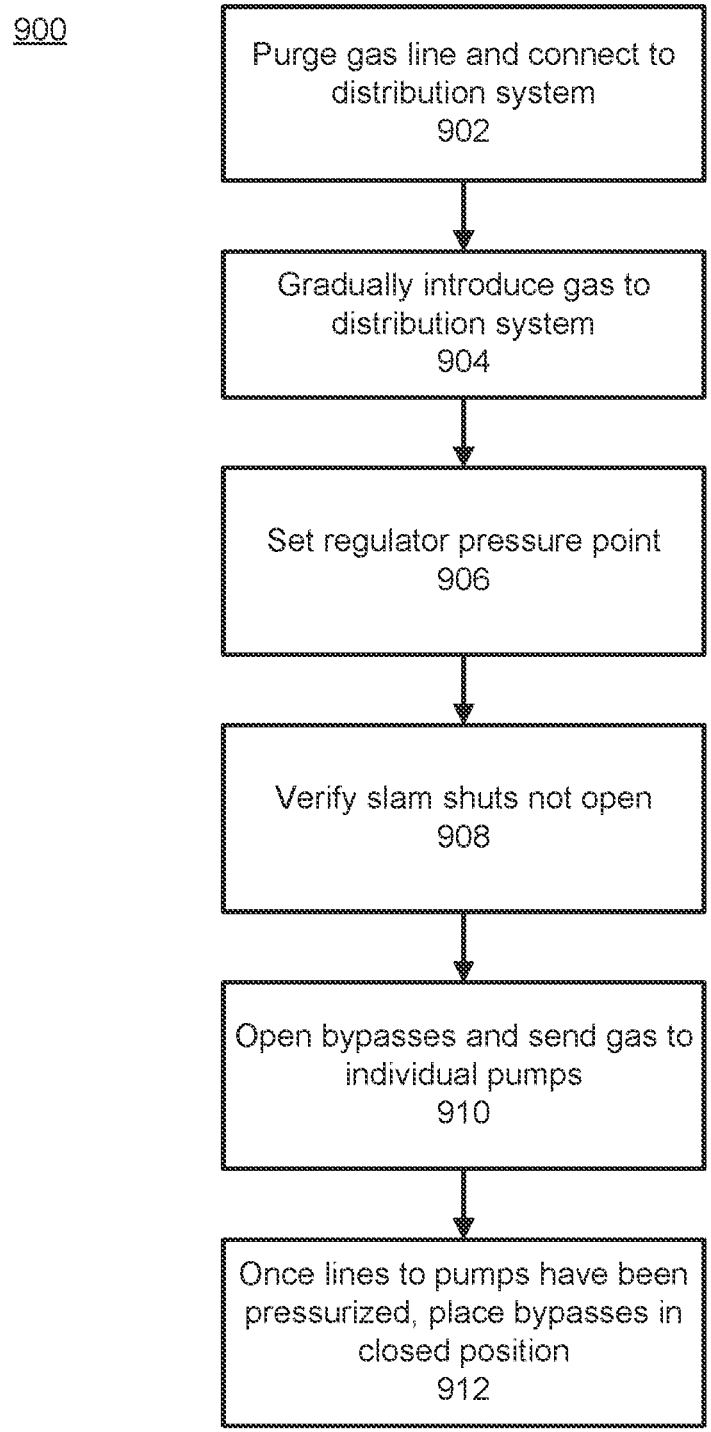
FIG. 9 is a flowchart showing an example method for setting up a portable natural gas distribution system in accordance with some implementations.

FIG. 9 is a flowchart showing an example process 900 for setting up a portable natural gas distribution system in accordance with some implementations. The process begins at 902, where the gas line going to the portable gas distribution system is purged of any debris and foreign objects. This helps prevent damage to the master regulators (e.g., Fischer 627 or KimRay 2200). Once the system is purged of debris, a gas line is installed to the trailer, vent lines are opened, and the system is purged of oxygen. When oxygen in the system is sufficiently purged, vent lines to the system are closed off. The process continues to 904.

At 904, gas is gradually provided to the system by slowly opening a master valve. The process continues to 906.

At 906, the regulator (627 or KimRay 2200) is set to the proper pressure set point (e.g., 95-120 psi range). The process continues to 908.

At 908, once an appropriate pressure setpoint is achieved, verify none of the slam shuts are pressured up and opened. If any slam shuts are open, they must be repaired before the distribution skid is placed in service. The process continues to 910.

At 910, if everything is operating correctly, slam shut bypasses are opened up to send gas to each individual pump. The process continues to 912.

At 912, when all gas lines to frack pump engines have been pressured up, place bypasses into the closed position. Once this action is taken, the distribution skid will be in normal operation mode (e.g., In-Service).

Figure 10:
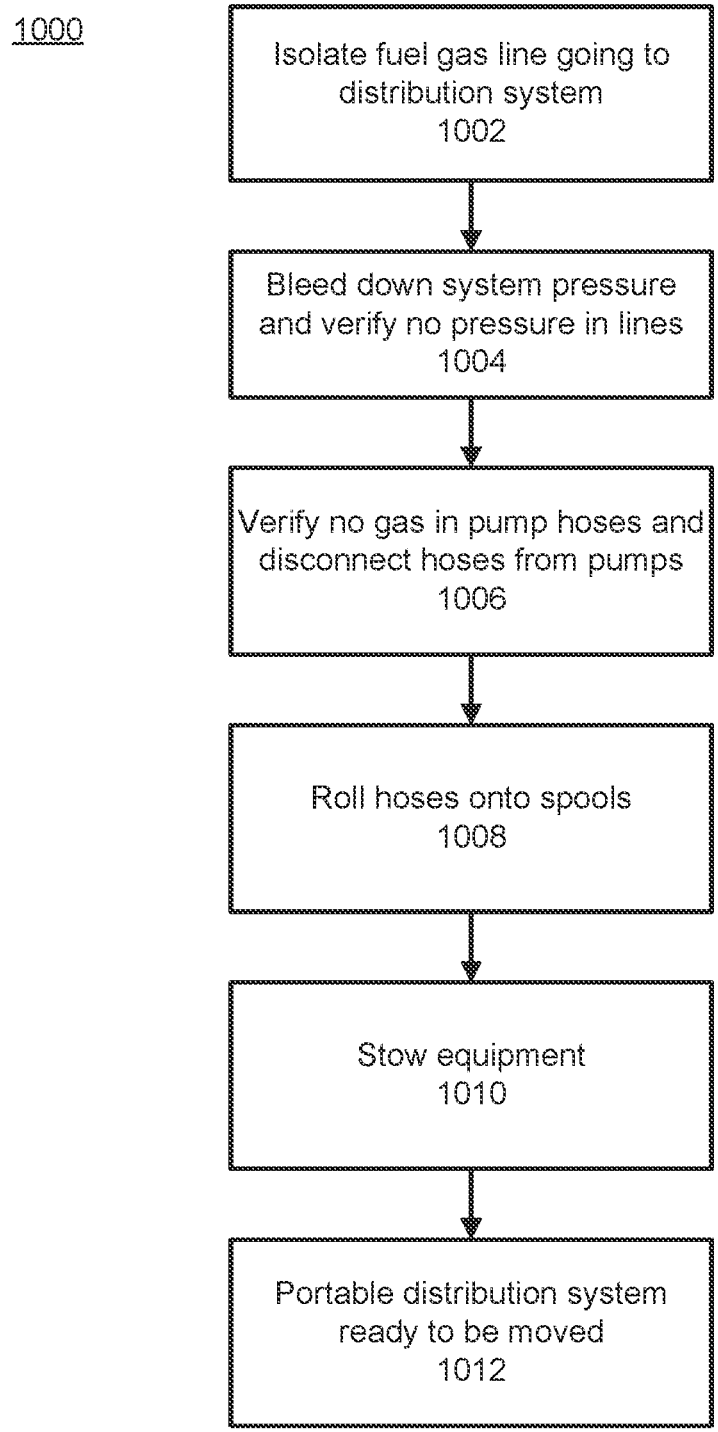
FIG. 10 is a flowchart showing an example method for shutting down and stowing a portable natural gas distribution system in accordance with some implementations.

FIG. 10 is a flowchart showing an example method for shutting down and stowing a portable natural gas distribution system in accordance with some implementations.

The process begins at 1002, where the fuel gas line going to distribution trailer is isolated. The process continues to 1004.

At 1004, the system is bled down through vent lines. Zero pressure is verified. The process continues to 1006.

At 1006, a verification that no gas is trapped in hoses is performed before disconnecting from frack pumps. The process continues to 1008.

At 1008, hoses are rolled up onto spools. The process continues to 1010.

At 1010, equipment is stowed. The process continues to 1012.

At 1012, the distribution trailer is ready to be moved.

Figure 11:
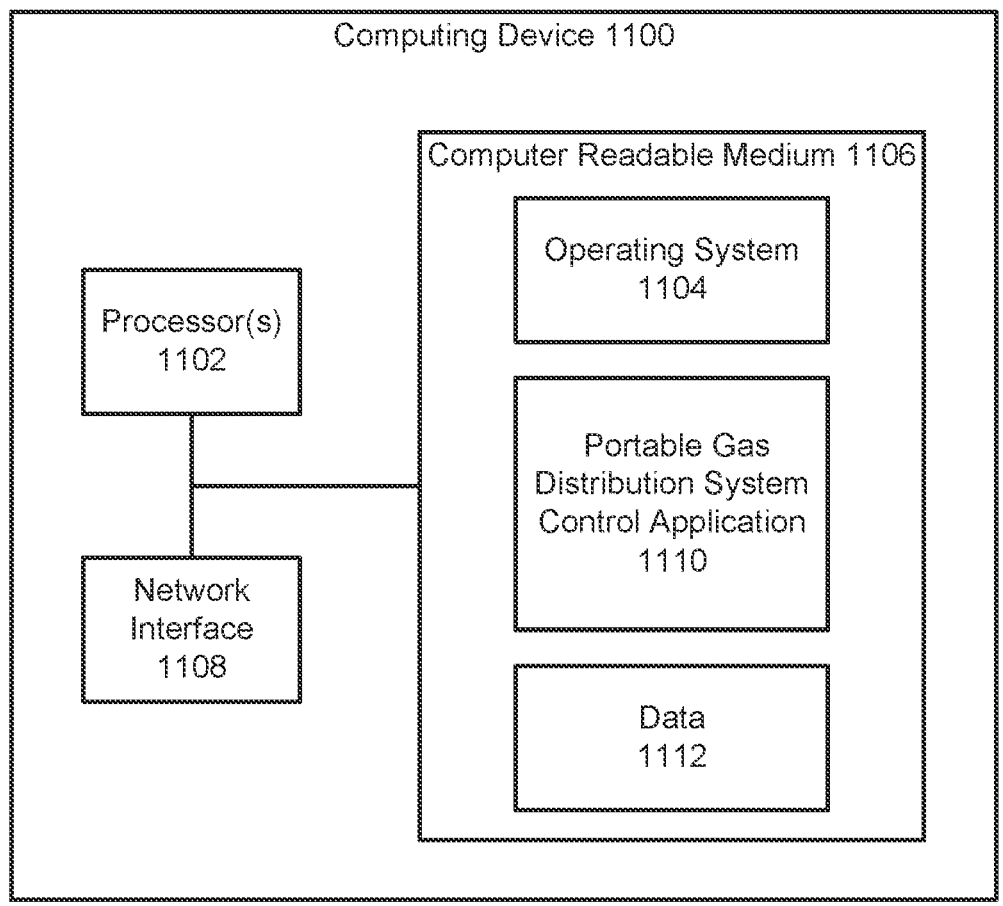
FIG. 11 is a diagram of an example computer system for controlling a portable natural gas distribution system in accordance with some implementations.

FIG. 11 is a diagram of an example computing device 1100 for controlling a portable natural gas distribution system in accordance with some implementations. The computing device 1100 includes one or more processors 1102, nontransitory computer readable medium 1106 and network interface 1108. The computer readable medium 1106 can include an operating system 1104, an application 1110 for electronic employment document control and a data section 1112 (e.g., for storing portable gas distribution system parameters, thresholds, data logs, etc.).

In operation, the processor 1102 may execute the application 1110 stored in the computer readable medium 1106. The application 1110 can include software instructions that, when executed by the processor, cause the processor to perform operations to monitor and control a portable gas distribution system in accordance with the present disclosure (e.g., to perform one or more operations of FIGS. 9 and 10).

The application program 1110 can operate in conjunction with the data section 1112 and the operating system 1104.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules) may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general-purpose computer, a special purpose computer, a microprocessor, a network server or switch, or the like.

While some example implementations have been described in terms of a general embodiment with several specific example modifications, it is recognized that other modifications and variations of the embodiments described above are within the spirit and scope of the disclosed subject matter. Applicant intends to embrace any and all such modifications, variations and embodiments.

What is claimed is:

1. A portable gas distribution system comprising:
   a mobile trailer having onboard:
   an input gas fitting;
   an emergency shut off valve coupled on a first side to the input gas fitting;
   a pressure reducer having a first side coupled to a second side of the emergency shut off valve;
   one or more coalescing filters coupled to a second side of the pressure reducer, wherein each coalescing filter includes a first filter to remove water;
   one or more manifolds having a first side coupled to a second side of the one or more coalescing filters respectively, each manifold having a plurality of ports, wherein each port is coupled to a low-pressure slam shut valve that is configured to sense a decrease in a pressure of a gas and will close when the pressure of the gas decreases below a threshold, and wherein each manifold includes a diffuser; and
   a plurality of hoses each having a first end and a second end, wherein each first end of each hose is coupled to a respective low-pressure slam shut valve.

2. The portable gas distribution system of claim 1, wherein each coalescing filter includes a second filter to filter particulates and heavy hydrocarbons.

3. The portable gas distribution system of claim 1, wherein each hose is wound onto a respective hose reel.

4. The portable gas distribution system of claim 1, wherein each second end of each hose includes a quick connector to connect to an engine to supply gas to the engine.

5. The portable gas distribution system of claim 1, wherein the one or more manifolds includes two manifolds.

6. The portable gas distribution system of claim 1, wherein the plurality of ports for each manifold includes 10-20 ports.

7. The portable gas distribution system of claim 1, wherein the emergency shut off valve is remotely controllable.

8. A portable gas distribution system comprising:
   a pressure reducer having a first side coupled to an input gas fitting;
   one or more coalescing filters coupled to a second side of the pressure reducer, wherein each coalescing filter includes a first filter to remove water and a second filter to filter particulates and heavy hydrocarbons;
   one or more manifolds having a first side coupled to a second side of the one or more coalescing filters respectively, each manifold having a plurality of ports, wherein each port is coupled to a low-pressure slam shut valve that is configured to sense a decrease in a pressure of a gas and will close when the pressure of the gas decreases below a threshold, and wherein each manifold includes a diffuser; and
   at least one hose having a first end and a second end, wherein the first end of the at least one hose is coupled to a respective low-pressure slam shut valve.

9. The portable gas distribution system of claim 8, wherein an emergency cutoff valve is disposed between the pressure reducer and the input gas fitting.

10. The portable gas distribution system of claim 8, wherein the at least one hose is wound onto a respective hose reel.

11. The portable gas distribution system of claim 8, wherein the second end of the at least one hose includes a quick connector to connect to an engine to supply gas to the engine.

12. The portable gas distribution system of claim 8, wherein the one or more manifolds includes two manifolds.

13. The portable gas distribution system of claim 8, the plurality of ports for each manifold includes 10-20 ports.

14. The portable gas distribution system of claim 8, wherein the emergency shut off valve is remotely controllable.

15. A gas distribution system comprising:
   one or more coalescing filters each having a first side coupled to a second side of a pressure reducer supplying input gas, wherein each coalescing filter includes a first filter to remove water;
   one or more manifolds having a first side coupled to a second side of the one or more coalescing filters respectively, each manifold having a plurality of ports, wherein each port is coupled to a low-pressure slam shut valve that is configured to sense a decrease in a pressure of a gas and will close when the pressure of the gas decreases below a threshold, and wherein each manifold includes a diffuser; and
   at least one hose having a first end and a second end, wherein the first end of the at least one hose is coupled to a respective low-pressure slam shut valve.

16. The gas distribution system of claim 15, further comprising an input gas fitting.

17. The gas distribution system of claim 16, further comprising an emergency shut off valve coupled on a first side to the input gas fitting, and wherein the pressure reducer has a first side coupled to a second side of the emergency shut off valve.

18. The gas distribution system of claim 15, wherein the at least one hose is wound onto a respective hose reel.

19. The gas distribution system of claim 15, wherein the second end of the at least one hose includes a quick connector to connect to an engine to supply gas to the engine.

20. The gas distribution system of claim 15, wherein each of the one or more manifolds includes two manifolds.

21. The gas distribution system of claim 15, wherein the plurality of ports for each manifold includes 10-20 ports.

22. The gas distribution system of claim 15, wherein the manifold includes a second filter to filter particulates and heavy hydrocarbons.

23. The portable gas distribution system of claim 15, wherein the emergency shut off valve is remotely controllable.

* * * * *